United States Patent [19]

Haugen

[11] Patent Number: 4,685,485
[45] Date of Patent: Aug. 11, 1987

[54] PNEUMATIC DEVICES WITH NOISE DAMPENING

[75] Inventor: Richard D. Haugen, Arlington Heights, Ill.

[73] Assignee: Honeywell Inc., Minneapolis, Minn.

[21] Appl. No.: 324,927

[22] Filed: Nov. 25, 1981

[51] Int. Cl.⁴ .............................................. G05D 16/00
[52] U.S. Cl. ........................................ 137/85; 251/64
[58] Field of Search ...................... 137/84, 85, 86, 82; 251/64

[56] References Cited

U.S. PATENT DOCUMENTS 3,072,143 1/1963 Fleischhacker ............... 251/64 X
3,169,402 2/1965 Baker ............................. 137/85 X Primary Examiner—Alan Cohan
Attorney, Agent, or Firm—Donald J. Lenkszus

[57] ABSTRACT

A pneumatic device having a housing defining at least two chambers with one of the chambers having a nozzle located therein, a diaphragm separating the two chambers, main pressure connected to one of the chambers, an output line connected to one of the chambers for providing an output signal having a value dependent upon the interaction between the nozzle and the diaphragm, and a dampening apparatus located within one of the chambers and touching the housing, the dampening apparatus being flexible for permitting movement of the diaphragm to control the output pressure in the output line and to dampen noise.

13 Claims, 3 Drawing Figures

PNEUMATIC DEVICES WITH NOISE DAMPENING

BACKGROUND OF THE INVENTION

The present invention relates to an apparatus for dampening the noise produced by pneumatic devices and, more particularly, to a flexible dampening apparatus which touches the housing of the pneumatic device and which permits movement of the diaphragm of the pneumatic device to control the output pressure and to dampen noise.

Typical pneumatic devices which may, for example, provide an output pressure in response to a sensed condition to control a load such as a pneumatic motor comprise a housing having at least two chambers divided by a diaphram. One of the chambers contains a nozzle which acts in cooperation with the diaphragm to control the output pressure from the pneumatic device. Typically, a source of main pressure is connected through a restriction to the chamber in which the nozzle is located. As a rule, the restriction which connects the source of main pressure to the pneumatic device is greater than the restrictions in the branch or output line. As a result, a searching condition, wherein the diaphragm will continually move closer and then farther away from the nozzle, will exist. The diaphragm is unable to find a stable position with respect to the nozzle at which the restriction between the diaphragm and the nozzle will balance the restriction in the main line and the restriction in the branch line. This searching condition is characterized by an audible hum.

Prior art devices have attempted to eliminate this audible hum or noise by placing steel balls in one of the pneumatic device chambers. The balls provide damping action by adding an impulse energy to the pusher plate between diaphragms in the pneumatic device at non-harmonic intervals to the frequency caused by the hum. However, such a device with steel balls therein depends on gravity and, therefore, proper mounting position. Another method to dampen noise is to apply grease to the pusher plate. This grease makes contact with both the pusher plate and the wall of the housing of the pneumatic device and adds resistance to high frequency movement. The use of grease is, however, too highly operator sensitive for proper application.

The present invention provides adequate damping without the problems of the prior art methods by utilizing a flexible pusher plate or disc which makes contact with the wall or walls of the pneumatic device to thereby dampen the vibration energy of the diaphragm and to eliminate audible hum.

SUMMARY OF THE INVENTION

Accordingly, the pneumatic device of the present invention includes a housing defining at least two chambers, one of the chambers having a nozzle therein, a diaphragm separating the at least two chambers, a first connector connecting a source of pressure to one of the chambers, a second connector connected to one of the chambers for providing an output signal, the output signal having a value dependent upon the force relationship between an input force and air pressure acting upon the diaphragm, and a dampening apparatus within one of the chambers and touching the housing, the dampening apparatus being flexible for permitting movement of the diaphragm to control the output pressure in the second connector and to dampen noise.

BRIEF DESCRIPTION OF THE DRAWINGS

These and other features and advantages will become more apparent from a detailed consideration of the invention when taken in conjuction with the drawings in which.

DETAILED DESCRIPTION

Figure 1:
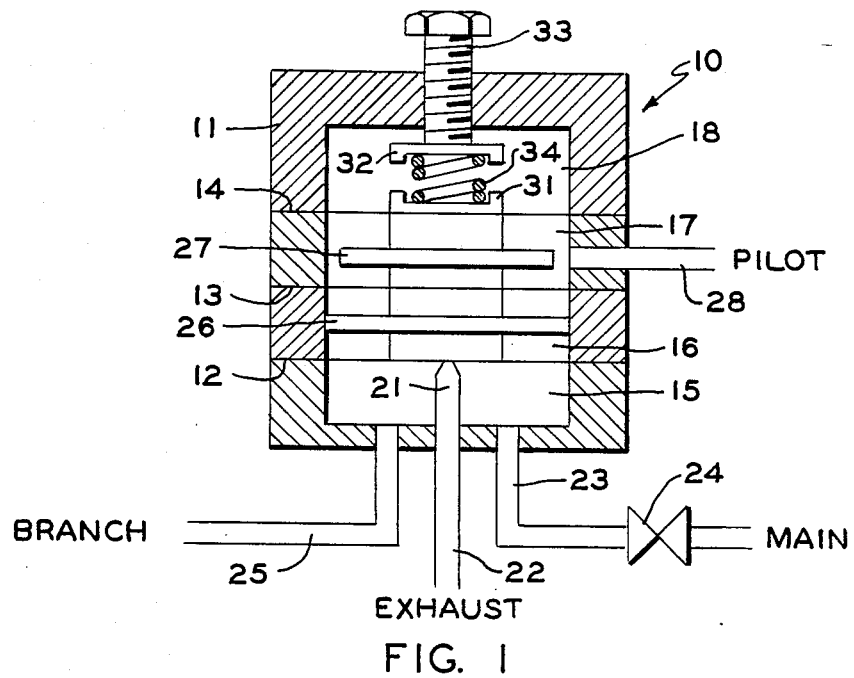
FIG. 1 shows a cross sectional view of the pneumatic device having the dampening apparatus according to the invention therein.

Pneumatic device 10 shown in FIG. 1 is used by way of example to illustrate the prsent invention and comprises housing 11 having a plurality of diaphragms 12, 13 and 14 separating the housing into output chamber 15, dampening chamber 16, pilot chamber 17 and setpoint chamber 18.

Within output chamber 15 is nozzle 21 connected to exhaust line 22. A first connecting means in the form of line 23 and restriction 24 connects a source of main pressure to output chamber 15 and ouput pressure is taken from output chamber 15 by branch (output) line 25.

Within dampening chamber 16 is an anti-hum disc or pusher plate 26 to be described hereinafter.

Pilot chamber 17 is connected to pilot line 28 which may be connected, for example, to a sensor such as a thermostat for providing pilot pressure to chamber 17. Within pilot chamber 17 is pusher plate 27. Pusher plates 26 and 27 are designed so that diaphragms 12, 13 and 14 will move in unison in response to the force exerted by spring 34 on disc 31. When the pressure within pilot chamber 17 resulting from the input in pilot line 28 is greater than the force exerted by spring 34 on disc 31, a net downward force will result. The magnitude of this force is dependent upon the magnitude of the pressure within pilot chamber 17.

Within setpoint chamber 18 is located first spring cup 31 and second spring cup 32. Second spring cup 32 is attached to adjustable screw 33 which can be used to adjust the tension on spring 34 extending between spring cups 31 and 32. Thus, the net downward force on diaphragms 12, 13, and 14 together with pusher plates 26 and 27 is caused by spring 34 as determined by the adjustment of screw 33.

Figure 3:
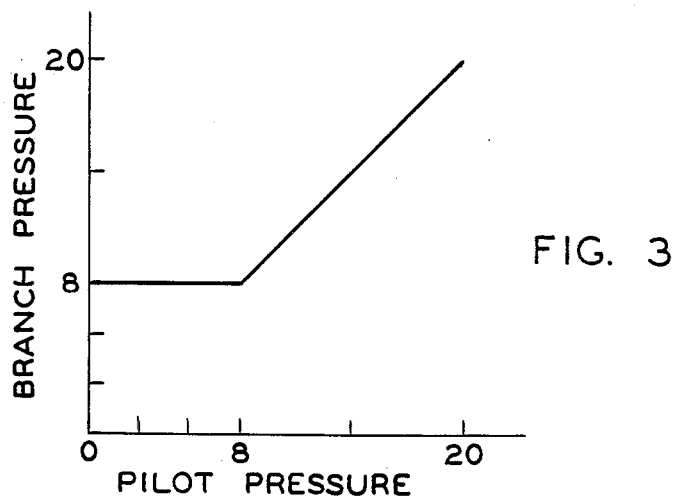
FIG. 3 shows the response curve for the device of FIG. 1.

In operation, screw 33 is adjusted to provide a minimum threshold output pressure for pneumatic device 10. For example, as shown in FIG. 3, this minimum output pressure in branch line 25 may be 8 psi. As main pressure is first connected to device 10 during initial startup, the pressure within chamber 15 will begin to build. As the pressure within chamber 15 reaches 8 psi, diaphragm 12 begins to lift off nozzle 21 and port excess pressure to atmosphere through exhaust 22. Thus, device 10 will hold the pressure in branch line 25 to 8 psi. As pilot pressure begins to increase within pilot chamber 17, the force contributed by the pilot pressure within pilot chamber 17 is subtracted from the downward force contributed by spring 34 and added to the downward force on diaphragm 13 until pilot pressure is equal to spring force as shown in the curve of FIG. 3.

Thus, if the pilot pressure is less than the spring pressure, the minimum position regulator functions as a regulator with the disc in contact with both diaphragms. When the pilot pressure exceeds the spring pressure, the spring is isolated and the pilot pressure controls the exhaust port. The disc is now free floating. The branch line pressure increases until it exceeds the pilot pressure. The closed exhaust port opens and the excees pressure is bled off closing the port. This process repeats, as necessary, keeping the branch line pressure the same as the pilot pressure.

Air flow is more restricted entering the output chamber 15 through restriction 24 than leaving output chamber 15 through branch line 25. Because there is a difference in restrictions, pressure within output chamber 15 fluctuates, and because the incoming restriction is greater than the outgoing restriction, diaphragm 12 oscillates about nozzle 21 at an audible frequency attempting to maintain constant pressure within output chamber 15. Uncorrected, this vibration results in hum. The prior art solution to dampen hum was to either place steel balls in the area between pusher plate 26 and diaphragm 13 thus adding impulse energy to pusher plate 26 at unharmonic intervals to the frequency caused by the hum to provide damping of the hum or to apply grease between pusher plate 26 and housing 11 thereby adding resistance to high frequency movement. The use of steel balls, however, made the device gravity sensitive and, therefore, proper mounting position was required. The use of grease made the device highly operator sensitive resulting in a requirement for a proper application.

Figure 2:
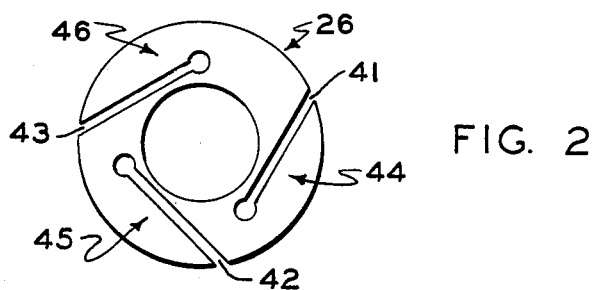
FIG. 2 shows a top view of the dampening apparatus used in FIG. 1.

In the present invention, pusher plate 26, shown in FIG. 2 as a disc but which can be of any geometric shape, is enlarged so that it touches housing 11 and is provided with cuts 41, 42 and 43 so that the outer circumference of pusher plate 26 is flexible. Flexible "arms" 44, 45 and 46 of pusher plate 26 touch the inside wall of housing 11. These arms remain stationary with respect to housing 11 but allow movement by diaphragm 12 towards and away from nozzle 21. At the same time, pusher plate 26 dampens the vibration of diaphragm 12 to reduce hum. Because movement of pusher plate 26 is extremely limited, pusher plate 26 is not subject to hysteresis or other undersirable effects.

The embodiments of the invention in which an exclusive property or right is claimed are defined as follows:

1. A pneumatic device having noise dampening comprising:
   housing means defining at least two chambers, one of said chambers having a nozzle therein;
   diaphragm means including a diaphragm separating said at least two chambers;
   first connecting means connecting a source of pressure to one of said chambers;
   second connecting means connected to one of said chambers for providing an output signal, said output signal having a value dependent upon interaction between said nozzle and said diaphragm; and,
   dampening means within one of said chambers and touching said housing means, said dampening means being flexible for permitting movement of said diaphragm to control said output pressure in said second connecting means and to dampen noise, said dampening means comprising a pusher plate having a flexible outer perimeter, contacting said housing means for permitting movement of said diaphragm to control said output pressure and to dampen noise, said pusher plate having cuts forming flexible arms which touch said housing means.

2. The device of claim 1 wherein said pusher plate is in the shape of a disc.

3. The device of claim 2 wherein said two chambers are comprised of first and second chambers, said first connecting means connects said source of pressure to said first chamber, said nozzle is located within said first chamber, said second connecting means is connected to said first chamber, and said dampening means is located within said second chamber.

4. The device of claim 3 wherein said housing means comprises a third chamber defined by a second diaphragm, and an adjustment mechanism located through said housing and into said third chamber for providing an adjustable force against said second diaphragm.

5. The device of claim 4 wherein said adjustment mechanism comprises a spring means contacting on one side said second diaphragm and on another side an adjustment screw which extends through said housing means.

6. The device of claim 5 wherein said housing means comprises a fourth chamber connected to a pilot input and having a pusher plate therein and defined by a third diaphragm which separates said fourth chamber from said second chamber and said second diaphragm which separates said fourth chamber from said third chamber, said pusher plate in said fourth chamber transmitting said force exerted against said second diaphragm by said spring through said third diaphragm, through said pusher plate of said dampening means, and through said diaphragm separating said at least two chambers.

7. The device of claim 1 wherein said two chambers are comprised of first and second chambers, said first connecting means connects said source of pressure to said first chamber, said nozzle is located within said first chamber, said second connecting means is connected to said first chamber, and said dampening means is located within said second chamber.

8. The device of claim 7 wherein said housing means comprises a third chamber defined by a second diaphragm, and an adjustment mechanism located through said housing and into said third chamber for providing an adjustable force against said second diaphragm.

9. The device of claim 8 wherein said adjustment mechanism comprises a spring means contacting on one side said second diaphragm and on another side an adjustment screw which extends through said housing means.

10. The device of claim 9 wherein said housing means comprises a fourth chamber connected to a pilot input and having a pusher plate therein and defined by a third diaphragm which separates said fourth chamber from said second chamber and said second diaphragm which separates said fourth chamber from said third chamber, said pusher plate in said fourth chamber transmitting said force exerted against said second diaphragm by said spring through said third diaphragm, through said dampening means, and through said diaphragm separating said at least two chambers.

11. The device of claim 1 wherein said housing means comprises a third chamber defined by a second diaphragm, and an adjustment mechanism located through said housing and into said third chamber for providing an adjustable force against said second diaphragm.

12. The device of claim 11 wherein said adjustment mechanism comprises a spring means contacting on one side said second diaphragm and on another side an adjustment screw which extends through said housing means.

13. The device of claim 12 wherein said housing means comprises a fourth chamber connected to a pilot input and having a pusher plate therein and defined by a third diaphragm which separates said fourth chamber from said fist and second chambers and said second diaphragm which separates said fourth chamber from said third chamber, said pusher plate in said fourth chamber transmitting said force exerted against said second diaphragm by said spring through said third diaphragm, through said dampening means, and through said diaphragm separating said at least two chambers.

* * * * *